(12) United States Patent
Tosato et al.

(10) Patent No.: US 8,111,176 B2
(45) Date of Patent: Feb. 7, 2012

(54) METHOD FOR ENCODING VECTORS

(75) Inventors: Filippo Tosato, Gloucester (GB); Stefania Sesia, Nice (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 225 days.

(21) Appl. No.: 12/664,438

(22) PCT Filed: Jun. 16, 2008

(86) PCT No.: PCT/IB2008/052362
§ 371 (c)(1),
(2), (4) Date: Dec. 14, 2009

(87) PCT Pub. No.: WO2008/155707
PCT Pub. Date: Dec. 24, 2008

(65) Prior Publication Data
US 2010/0182172 A1    Jul. 22, 2010

(30) Foreign Application Priority Data

Jun. 21, 2007  (EP) .................................. 07301141

(51) Int. Cl.
*H03M 7/00* (2006.01)

(52) U.S. Cl. .......................................... 341/50; 375/260

(58) Field of Classification Search ............... 341/50; 375/260, 267, 299, 329, 347; 455/403, 562.1, 455/132, 137; 704/221, 223, 207, 219
See application file for complete search history.

(56) References Cited

U.S. PATENT DOCUMENTS 7,571,094 B2 * 8/2009 Goudar ........................ 704/221
2006/0056531 A1   3/2006 Li et al.

FOREIGN PATENT DOCUMENTS

WO   2006029261 A1   3/2006

OTHER PUBLICATIONS

K. Terada et al, "Real Time Low Bit-Rate Video Coding Algorithm Using Multi-Stage Hierarchical Vector Quantization", Acoutics, Speech and Signal Processing, vol. 5, May 12, 1998, p. 2673-2676.

* cited by examiner

*Primary Examiner* — Joseph Lauture

(57) ABSTRACT

The present invention relates to a method for encoding a vector for transmission from a transmitter to a receiver, comprising a step of selecting a first vector in a predefined M-dimensional vector codebook, and at least one refinement step wherein an error vector between the random vector and the first vector is quantised by means of selecting a further vector from a further vector codebook with dimensionality reduced by one relative to the previous step, wherein the M-dimensional vector codebook and the further predefined vector codebook are known to both the transmitter and receiver.

12 Claims, 3 Drawing Sheets

METHOD FOR ENCODING VECTORS

FIELD OF THE INVENTION

The present invention relates to a method of encoding vectors for a multiple-input multiple-output MIMO transmission signal.

This invention is, for example, relevant for MIMO signals, implemented for instance in the UMTS (Universal Mobile Telecommunications System).

BACKGROUND OF THE INVENTION

One critical aspect of communication systems operating in frequency division duplex FDD mode is for the terminals to provide the transmitter with reliable channel state information CSI, which allows scheduling of users in the downlink, selection of adaptive modulation and coding schemes as well as pre-processing of the data signals according to the channel conditions.

This control information is fundamental, e.g. in transmission schemes using antenna arrays at either or both transmission ends. In fact, in order to exploit the MIMO gains in terms of higher throughput and/or higher reliability of the transmit data, the transmitter should be able to form beams that match the propagation channel of the target user and possibly minimise interference from other unwanted beams. This is achieved by applying pre-coding techniques at the transmitter side, which requires accurate knowledge of the channel propagation coefficients from each pair of transmitting and receiving antenna elements.

This CSI is typically communicated to the transmitter in an FDD system by means of control information fed back periodically by the receiving terminals. The control signalling generally contains an encoded representation of a vector of channel measurements, plus a channel quality indicator CQI indicating the signal-to-noise plus interference ratio SINR at which the receiver is expecting to operate.

One common way of encoding the channel vector is by providing a codebook of vectors, which is known to both the transmitter and the terminal, such that the terminal feeds back an index corresponding to the codebook vector that is closest to the channel vector by some metric. This is basically a vector quantisation operation. This quantisation index report is carried out periodically in time and frequency, meaning that an index is fed back every given time-frequency resource block. These feedback reports show some level of correlation, which increases as the channel variations in time and frequency become slower.

SUMMARY OF THE INVENTION

It is an object of the invention to reduce the bit rate of the control signalling and/or increase the accuracy of the CSI reports. To this end, it makes sense to try to exploit the correlation mentioned above.

Thus, there is provided a method for encoding a vector for transmission from a transmitter to a receiver, comprising a step of selecting a first vector in a predefined M-dimensional vector codebook, and at least one refinement step wherein an error vector between the random vector and the first vector is quantised by means of selecting a further vector from a further vector codebook with dimensionality reduced by one relative to the previous step, wherein the M-dimensional vector codebook and the further predefined vector codebook are known to both the transmitter and receiver.

According to an embodiment of the invention, a further vector codebook with dimensionality reduced by one relative to the previous step is obtained by rotating a pre-defined vector codebook with dimensionality reduced by one relative to the previous step.

According to another embodiment of the invention, the rotation parameters are fully determined by the vectors selected in the previous steps of the procedure.

According to another embodiment of the invention, an indicator of the result of the quantisation at each step is signalled from the transmitter to the receiver.

There is also provided an encoder for encoding a vector for transmission from a transmitter to a receiver, which is configured for selecting a first vector in a predefined M-dimensional vector codebook, and for performing at least one refinement step wherein an error vector between the random vector and the first vector is quantised by means of selecting a further vector from a further vector codebook with dimensionality reduced by one relative to the previous step, wherein the M-dimensional vector codebook and the further predefined vector codebook are known to both the transmitter and receiver.

The invention can be applied in the encoding of control signalling in wireless communication systems particularly UMTS LTE or other future cellular systems.

Therefore, there is provided a wireless communication terminal comprising such an encoder for encoding a random vector and a transmitter for transmitting said random vector to a receiver, and a base station comprising such an encoder for encoding a random vector and a transmitter for transmitting said random vector to a receiver.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
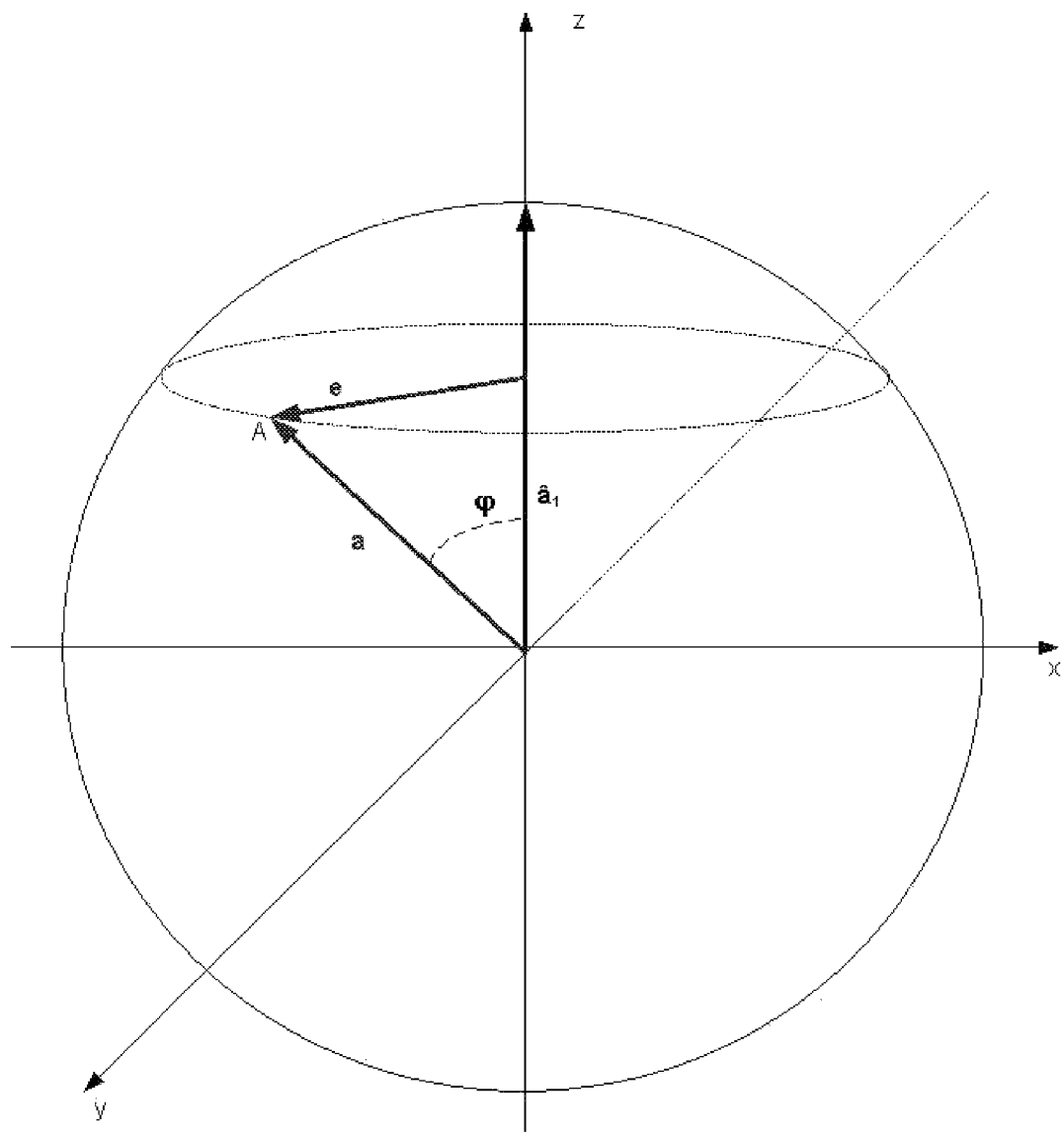
FIG. 1 to 3 represent the steps of the refinement method of the invention where M=3.

In this invention we describe a method for encoding a random vector in multiple steps with increased accuracy, that allows to refine the information conveyed by the vector in case of successive reporting of correlated instances of the vector.

In its most general form the invention can be described as follows: if the vector to be encoded has dimension M, a number of vector codebooks are provided which are good for vector quantisation in vector spaces of dimensions M, M−1, down to dimension 2, the number of codebooks depending on the maximum number of refinement steps that are considered for a given application.

The first step of the encoding process is an ordinary vector quantisation operation with the M-dimensional codebook. Let us call this refinement step 0.

In the next encoding operation, a test procedure may first be performed, in which the vector, which may have changed from the previous step, is quantised again with the M-dimensional codebook. If the quantisation results in a different vector index from the previous step, then this new vector is taken as the new representation of the vector. If, however, the quantisation vector index from codebook M is the same as in the previous operation, then a further refinement step is accessed. The quantisation error produced by codebook M is itself quantised by using codebook M−1. Let us call this refinement step 1. This is possible because the quantisation error vector lies in the vector space orthogonal to the quantisation vector, which has dimensionality M−1. In a possible implementation of the method the test procedure described above can be skipped and the terminal may be forced to always report the result of the refinement step 1 after step 0 in a regular pattern. In this case, if no refinement is possible due to the vector index from the M-dimensional codebook having changed, the terminal may signal this fact to the transmitter.

In the next encoding operation a test procedure may again first be performed, in which the vector is again quantised with codebook M and M−1. If either of these operations returns a different index from the previous steps, than the new representation of the vector is given by this new index. Otherwise, if both operations return the same indices, or if the test procedure is skipped, the method proceeds with a further refinement step in which the error vector associated with refinement step 1 is quantised with codebook M−2. This is refinement step 2.

The iterative procedure may continue by further refining the vector representation if codebooks are provided for further refinement steps. When the procedure produces a quantisation index with the smallest codebook dimensionality provided, it continues using this same codebook, provided that the quantisation indices from larger codebook dimensionalities are unchanged from the previous step.

At each step, the predefined codebook of the relevant dimensionality may be rotated to ensure that it is orthogonal to the vector selected in the preceding step. Advantageously, the rotation may be designed such that it is uniquely determined from the vectors selected in the preceding steps; this has the advantage that the rotation used can be fully known to both the transmitter and the receiver without additional signalling.

The invention is based on the use of different codebooks with reduced dimensionality at successive steps of the encoding process. Each of these codebooks can be optimised for each dimension and the codebooks are independent from each other. Moreover, as the dimension reduces the codebook size can be reduced whilst keeping the average distortion the same.

The technique of the invention can be used for example to encode channel state information CSI to be reported from the terminals to the base station in a communication system. In case of signalling of the CSI, the output of the quantisation operations carried out at different steps can be used at successive signalling events in time, or for successive adjacent resource blocks in frequency, or for successive adjacent spatial paths of the channel. According to the technique of the invention, each successive feedback message using a quantisation codebook of reduced dimensionality provides the base station is with a more refined version of the channel state information, in any case where there is a correlation between one instance of the CSI and the next.

If the test procedure is performed at each step as described above, the number of refinement steps in the technique will automatically depend on the degree of correlation between successive instances of the vector to be encoded. Alternatively, the number of refinement steps may be set according to a measured or predicted correlation between successive instances of the vector to be encoded, or may be predetermined.

Hereinafter, we describe a possible implementation of this invention. For the sake of simplicity we consider a real-valued M-dimensional vector a, where M=3, and we illustrate the quantisation operation carried out with a 3-dimensional codebook (refinement step 0) and refinement step 1, using a 2-dimensional codebook. The quantisation metric in this example is chordal distance.

In FIG. 1 refinement step 0 is depicted. Only the codebook vector with minimum chordal distance from a is drawn, $\hat{a}_1$ along with the quantisation error vector e. The approximate representation of a, at refinement step 0 is simply given by $\hat{a}_1$.

Figure 2:
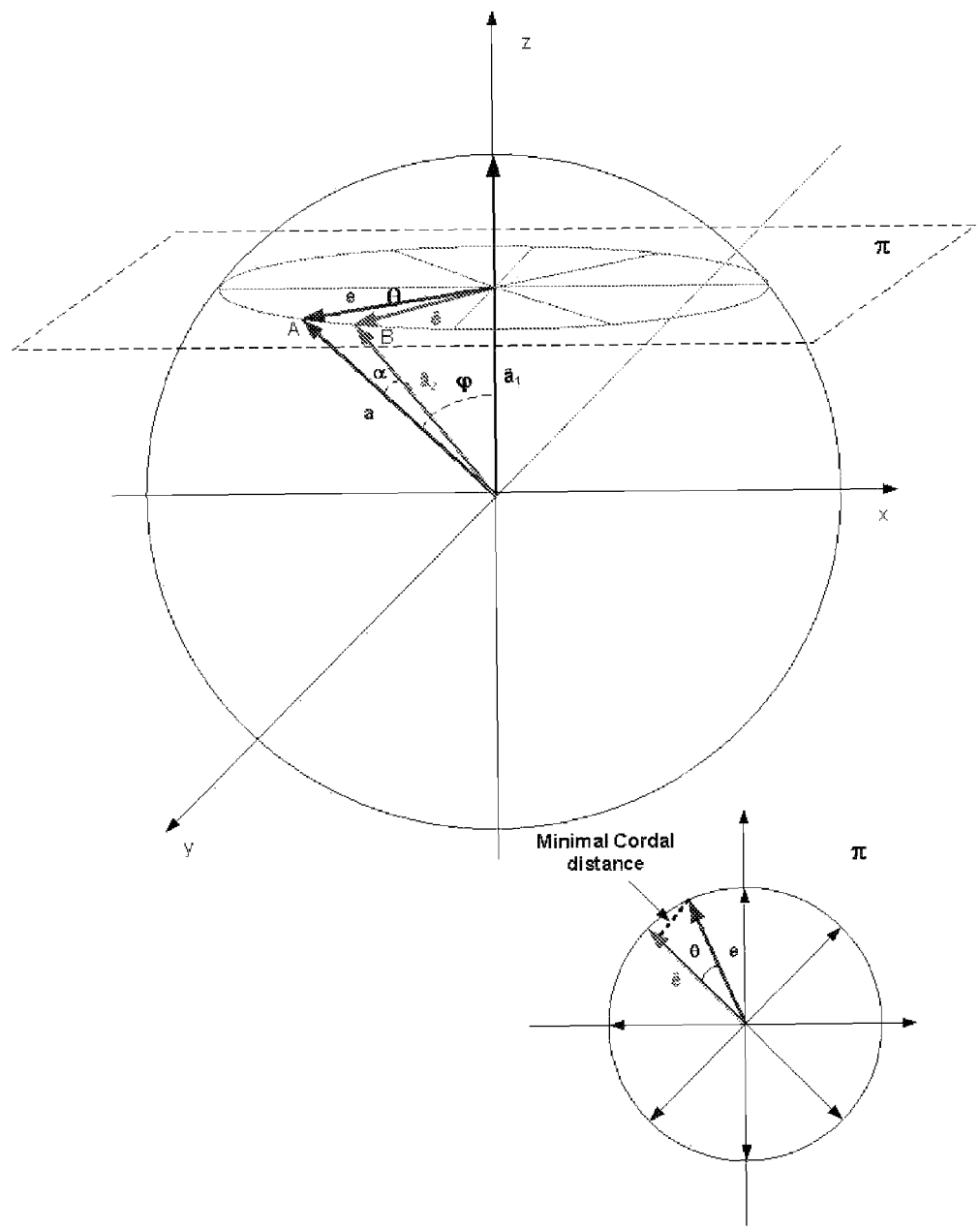
Figure 3:
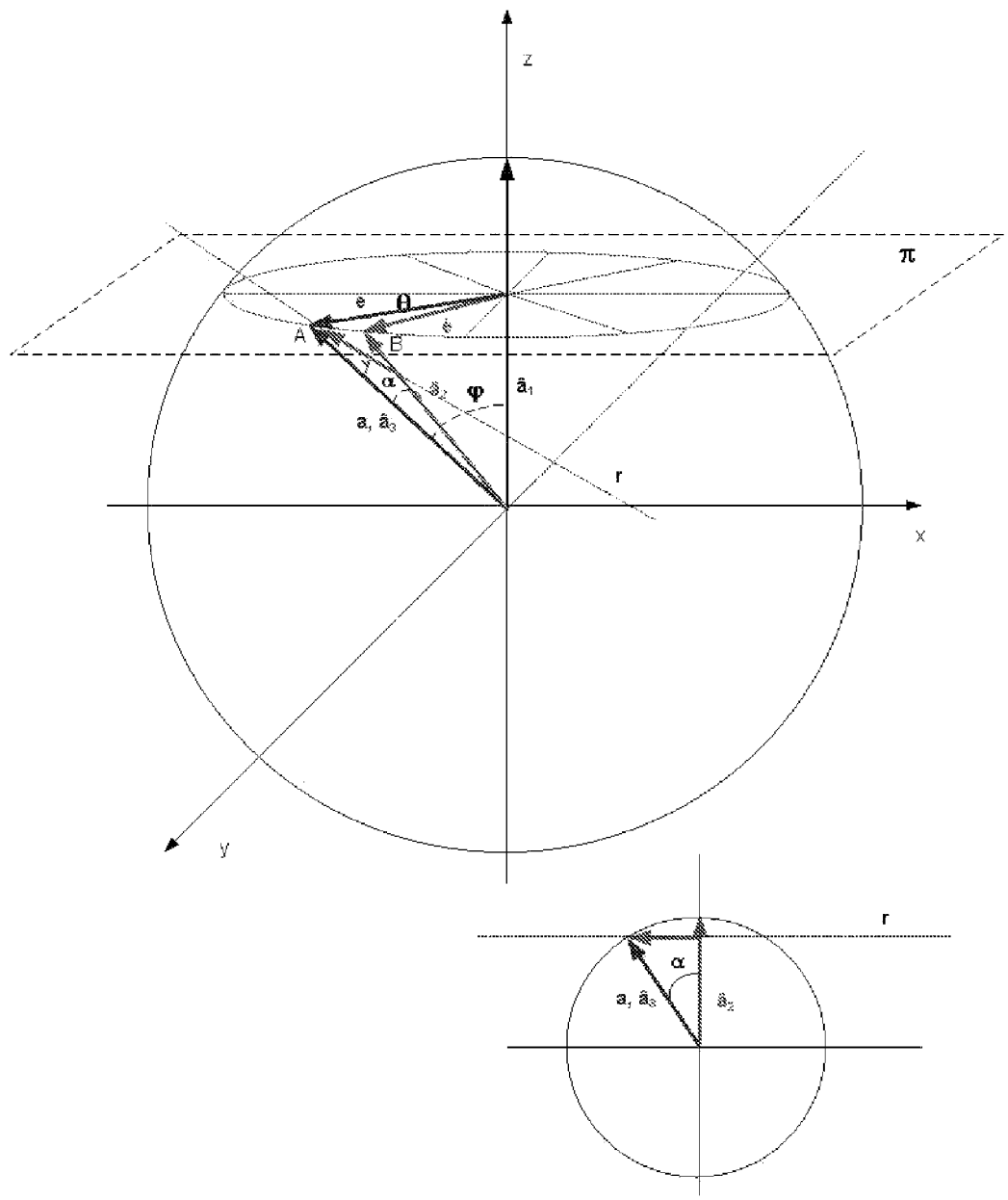

In refinement step 1 depicted in FIG. 2, the quantisation error vector e from step 0 is itself quantised by using the a 2-dimensional codebook provided beforehand. The quantised representation of e is given by ê, while the refined representation of vector a has now become $\hat{a}_1 \cos \phi + \hat{e}$ FIG. 3 shows the complete picture of the two-step quantisation procedure. It can be shown that under very mild conditions on the minimum chordal distances of the two codebooks the amplitude of the error vector γ after refinement step 1 is always smaller than the amplitude of the error vector e at step 0.

The invention claimed is:

1. A method for encoding a vector for transmission from a transmitter to a receiver, comprising a step of selecting a first vector in a predefined M-dimensional vector codebook, and at least one refinement step wherein an error vector between a random vector and the first vector is quantised by means of selecting a further vector from a further vector codebook with dimensionality reduced by one relative to the previous step, wherein the M-dimensional vector codebook and the further predefined vector codebook are known to both the transmitter and receiver.

2. The method of claim 1, wherein a further vector codebook with dimensionality reduced by one relative to the previous step is obtained by rotating a pre-defined vector codebook with dimensionality reduced by one relative to the previous step.

3. The method of claim 2, wherein the rotation parameters are fully determined by the vectors selected in the previous steps of the procedure.

4. The method of claim 1, wherein an indicator of the result of the quantisation at each step is signalled from the transmitter to the receiver.

5. The method of claim 4, wherein at each refinement step a quantisation is first carried out using the codebook of each of the previous steps, and if the result of all the quantisations is the same as in the previous step the refinement step is carried out and the result of the refinement step signalled, whereas if the result of at least one of the quantisations is different from in the previous step the result is signalled of the quantisation using the smallest-dimensioned codebook for which the result is different from the previous step.

6. The method of claim 4, wherein at each refinement step a quantisation is first carried out using the codebook of the previous step, and if the result of the quantisations is the same as in the previous step the refinement step is carried out and the result of the refinement step signalled, whereas if the result of the quantisation is different from in the previous step an indicator is signalled that refinement is not possible.

7. The method of claim 4, wherein each refinement step is performed for a successive time interval according to a pre-defined sequence.

8. The method of claim 1, wherein the vector represents state information of a radio channel.

9. The method of claim 8, wherein each step is carried out for the radio channel at least one of a different time, frequency or spatial aspect.

10. A encoder for encoding a vector for transmission from a transmitter to a receiver, which is configured for selecting a first vector in a predefined M-dimensional vector codebook, and for performing at least one refinement step wherein an error vector between a random vector and the first vector is quantised by means of selecting a further vector from a further vector codebook with dimensionality reduced by one relative to the previous step, wherein the M-dimensional vector codebook and the further predefined vector codebook are known to both the transmitter and receiver.

11. A wireless communication terminal comprising an encoder as claimed in claim 10 for encoding a random vector and a transmitter for transmitting said random vector to a receiver.

12. A base station comprising an encoder as claimed in claim 10 for encoding a random vector and a transmitter for transmitting said random vector to a receiver.

* * * * *